United States Patent
Kido et al.

(10) Patent No.: US 9,553,667 B2
(45) Date of Patent: Jan. 24, 2017

(54) VISIBLE LIGHT COMMUNICATION APPARATUS

(71) Applicant: Panasonic Corporation, Osaka (JP)

(72) Inventors: Shojirou Kido, Osaka (JP); Eiji Shiohama, Osaka (JP); Yoshihiko Matsukawa, Nara (JP); Masaaki Ikehara, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/499,437

(22) Filed: Sep. 29, 2014

(65) Prior Publication Data

US 2015/0098708 A1  Apr. 9, 2015

(30) Foreign Application Priority Data

Oct. 7, 2013  (JP) .................................. 2013-210586

(51) Int. Cl.
| | | |
|---|---|---|
| H04B 10/00 | (2013.01) | |
| H04B 10/04 | (2006.01) | |
| H04J 14/02 | (2006.01) | |
| H04B 10/116 | (2013.01) | |
| H05B 37/02 | (2006.01) | |
| H04B 10/532 | (2013.01) | |
| H04B 10/25 | (2013.01) | |

(52) U.S. Cl.
CPC ............ *H04B 10/116* (2013.01); *H04B 10/25* (2013.01); *H04B 10/532* (2013.01); *H05B 37/02* (2013.01)

(58) Field of Classification Search
CPC ..... H05B 37/02; H04B 10/116; H04B 10/532; H04B 10/6166; H04B 10/61; H04B 10/00; H04B 10/04; H04B 10/25; H04B 10/2513; H02M 2001/0006; H02M 5/2573; H02P 25/14
USPC ..... 398/130, 118, 184, 65, 79; 315/397, 186
See application file for complete search history.

(56) References Cited

U.S. PATENT DOCUMENTS

| | | | | |
|---|---|---|---|---|
| 6,794,831 B2 * | 9/2004 | Leeb | .................. | H04B 10/1143 315/307 |
| 7,031,132 B1 * | 4/2006 | Mitchell | ................ | H02H 9/026 219/504 |

(Continued)

FOREIGN PATENT DOCUMENTS

| | | |
|---|---|---|
| JP | 2012-69505 | 4/2012 |
| JP | 2013-26690 | 2/2013 |

(Continued)

*Primary Examiner* — Ken N Vanderpuye
*Assistant Examiner* — Abbas H Alagheband
(74) *Attorney, Agent, or Firm* — Renner, Otto, Boisselle & Sklar, LLP (57) ABSTRACT

A visible light communication apparatus includes a constant current circuit and a load circuit including light emitting elements connected to output terminals of the constant current circuit. Further, the visible light communication apparatus includes a load variation circuit configured to change load characteristics of the load circuit by electrically connecting to the load circuit, the load variation circuit including a series circuit of a diode and a resistor connected in series to the load circuit and a switching element configured to electrically connect or disconnect the load variation circuit to the load circuit in response to a binary communication signal.

4 Claims, 5 Drawing Sheets

(56) References Cited

U.S. PATENT DOCUMENTS

| | | | | |
|---|---|---|---|---|
| 7,656,103 B2* | 2/2010 | Shteynberg | H05B 33/0815 | 315/312 |
| 7,902,769 B2* | 3/2011 | Shteynberg | H05B 33/0815 | 315/291 |
| 8,570,770 B2* | 10/2013 | Eisenbeis | G01R 15/22 | 315/291 |
| 8,766,897 B2* | 7/2014 | Yoshida | G09G 3/3614 | 345/100 |
| 8,810,155 B2* | 8/2014 | Kamada | H04B 10/116 | 315/247 |
| 8,853,963 B2* | 10/2014 | Liscinsky | H05B 33/0809 | 200/310 |
| 9,166,685 B2* | 10/2015 | Kido | H04B 10/116 | |
| 9,271,349 B2* | 2/2016 | Radermacher | H05B 33/0812 | |
| 9,451,679 B2* | 9/2016 | Nishino | H05B 37/0272 | |
| 2002/0033735 A1* | 3/2002 | Hasegawa | H03F 1/302 | 330/302 |
| 2007/0182338 A1* | 8/2007 | Shteynberg | H05B 33/0815 | 315/200 R |
| 2007/0182347 A1* | 8/2007 | Shteynberg | H05B 33/0815 | 315/312 |
| 2008/0018267 A1* | 1/2008 | Arakawa | H05B 33/0815 | 315/301 |
| 2011/0222849 A1* | 9/2011 | Han | H04B 10/1149 | 398/25 |
| 2012/0051757 A1* | 3/2012 | Nishino | H04B 10/1149 | 398/201 |
| 2012/0112046 A1* | 5/2012 | Nakamura | H04B 10/116 | 250/214.1 |
| 2012/0250462 A1* | 10/2012 | Franchini | G01S 15/8906 | 367/87 |
| 2013/0015784 A1* | 1/2013 | Kamada | H04B 10/116 | 315/297 |
| 2013/0015785 A1* | 1/2013 | Kamada | H04B 10/116 | 315/297 |
| 2013/0057171 A1* | 3/2013 | Liscinsky | H05B 33/0809 | 315/200 R |
| 2013/0278157 A1* | 10/2013 | Radermacher | H05B 33/0812 | 315/186 |
| 2014/0321860 A1* | 10/2014 | Kido | H04B 10/116 | 398/118 |
| 2014/0361696 A1* | 12/2014 | Siessegger | H05B 33/0803 | 315/186 |
| 2015/0098708 A1* | 4/2015 | Kido | H04B 10/116 | 398/118 |
| 2016/0072583 A1* | 3/2016 | Naruo | H04B 10/116 | 398/38 |

FOREIGN PATENT DOCUMENTS

| | | |
|---|---|---|
| JP | 2013-26691 | 2/2013 |
| JP | 2013-26692 | 2/2013 |
| JP | 2013-110634 | 6/2013 |

* cited by examiner

VISIBLE LIGHT COMMUNICATION APPARATUS

CROSS-REFERENCE TO RELATED APPLICATION

This application claims priority to Japanese Patent Application No. 2013-210586 filed on Oct. 7, 2013, the entire contents of which are incorporated herein by reference.

TECHNICAL FIELD

The present disclosure relates to a visible light communication apparatus.

BACKGROUND ART

Conventionally, there is known a visible light communication apparatus (illumination apparatus) which includes light emitting diodes (LEDs) as a light source and transmits a signal by modulating the intensity of illumination light (see, e.g., Japanese Unexamined Patent Application Publication No. 2013-110634). In the visible light communication apparatus, since the signal is transmitted by modulating the illumination light itself, there is no need for a special device as in an infrared communication device. Further, since power saving can be achieved by using light emitting diodes as the light source, it is being studied to use the visible light communication apparatus in a ubiquitous information system for the underground shopping district or the like.

The visible light communication apparatus disclosed in Japanese Unexamined Patent Application Publication No. 2013-110634 includes a resistor connected in series to the light emitting diodes and a switching element connected in parallel to the resistor. Further, by controlling the turning-on and the turning-off of the switching element in response to a communication signal, and modulating the light intensity of the light emitting diodes, the communication signal is superimposed on the illumination light outputted from the light emitting diodes.

Generally, if a current flowing through the light emitting diodes is small, the light emitting diodes has characteristics that a resistance value of the equivalent resistance of the light emitting diodes increases. Therefore, during dimming of the light emitting diodes in which the current supplied to the light emitting diodes is small, there is a possibility that a modulation degree decreases and a communication error occurs.

SUMMARY OF THE INVENTION

In view of the above, the present disclosure provides a visible light communication apparatus capable of suppressing a reduction in modulation degree during dimming of light emitting elements.

In accordance with an aspect of the present invention, there is provided a visible light communication apparatus including a constant current circuit, a load circuit including light emitting elements connected to output terminals of the constant current circuit, a load variation circuit configured to change load characteristics of the load circuit by electrically connecting to the load circuit, the load variation circuit including a series circuit of a diode and a resistor connected in series to the load circuit, and a switching element configured to electrically connect or disconnect the load variation circuit to the load circuit in response to a binary communication signal.

In the visible light communication apparatus, the load variation circuit may partially change load characteristics of the load circuit and a resistance value of the resistor may be greater than a resistance value of an equivalent resistance of the diode.

Preferably, the diode includes a rectifier diode.

Alternatively, the diode may include a light emitting diode.

With the above configuration since both the resistance value of the equivalent resistance of the load circuit (light emitting elements) and the resistance value of the equivalent circuit of the load variation circuit increase when the load current decreases, there is an effect that it is possible to suppress a reduction in modulation degree during dimming of the light emitting elements.

BRIEF DESCRIPTION OF THE DRAWINGS

The figures depict one or more implementations in accordance with the present teaching, by way of example only, not by way of limitations. In the figures, like reference numerals refer to the same or similar elements.

DETAILED DESCRIPTION

Hereinafter, an embodiment of the present invention will be described in detail with reference to the accompanying drawings.

Embodiment

Figure 1:
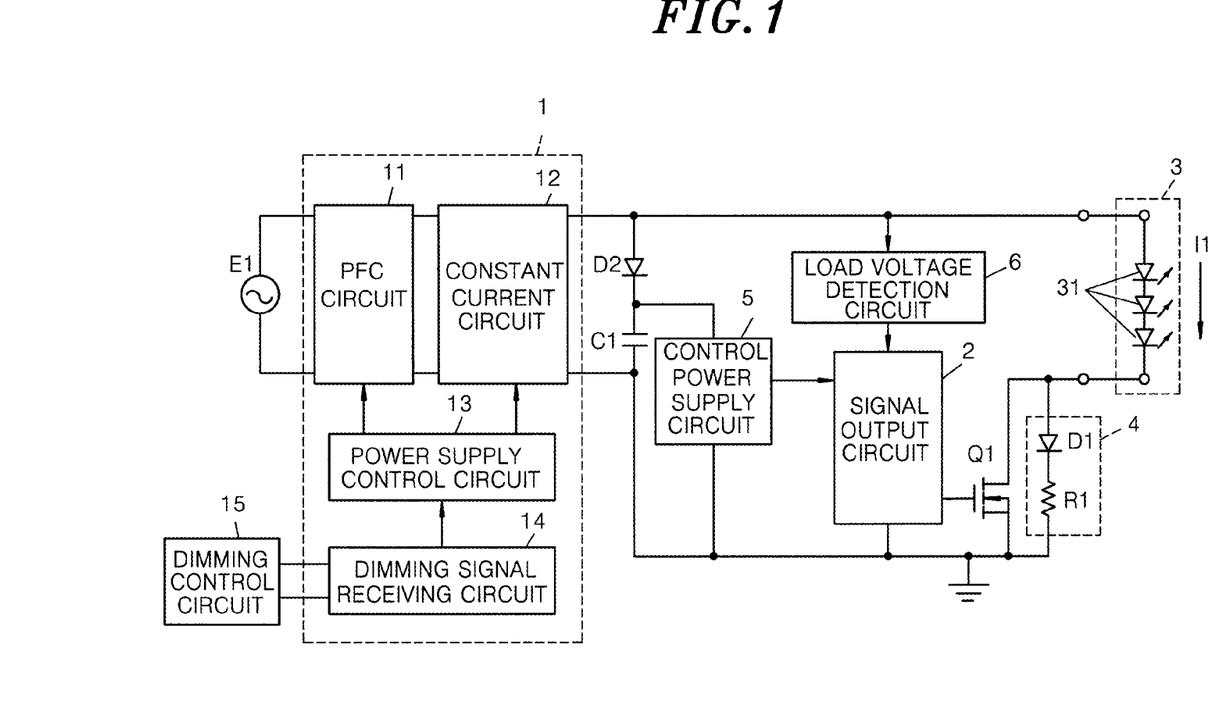
FIG. 1 shows a circuit diagram of a visible light communication apparatus in accordance with an embodiment.

FIG. 1 shows an example of a circuit configuration of a visible light communication apparatus in accordance with the present embodiment. The visible light communication apparatus of the present embodiment mainly includes a power supply circuit 1, a signal output circuit 2, a load circuit 3, a load variation circuit 4, and a switching element Q1. The visible light communication apparatus transmits a signal by modulating illumination light of light emitting diodes 31 (light emitting elements) included in the load circuit 3. In the following, there will be described a configuration of the visible light communication apparatus of the present embodiment.

The load circuit 3 includes the light emitting diodes 31 connected in series, and functions as a light source.

The power supply circuit 1 receives an input power from a commercial power source E1 and supplies a load current I1 to the load circuit 3 (light emitting diodes 31). Specifically, the power supply circuit 1 includes a power-factor-correction (PFC) circuit 11, a constant current circuit 12, a power supply control circuit 13, and a dimming signal receiving circuit 14. The PFC circuit 11 is connected to the commercial power source E1. The PFC circuit 11 converts AC power supplied from the commercial power source E1 into DC power while improving a power factor thereof, and outputs the DC power to the constant current circuit 12. The constant current circuit 12 includes a DC-DC converter circuit such as a step-down chopper circuit, and the output terminals of the constant current circuit 12 are connected to a series circuit of the light emitting diodes 31. Accordingly, the constant current circuit 12 supplies the load current I1 to the light emitting diodes 31.

A dimming control circuit 15 is provided outside the visible light communication apparatus. The dimming control circuit 15 outputs a dimming signal indicating a dimming level of the light emitting diodes 31 to the dimming signal receiving circuit 14. The dimming signal receiving circuit 14 reads the dimming level from the received dimming signal and outputs the read dimming level to the power supply control circuit 13. The power supply control circuit 13 controls the constant current circuit 12 such that the load current I1 supplied to the light emitting diodes 31 has a current value corresponding to the dimming level received from the dimming signal receiving circuit 14.

For example, if the dimming level is 100% (rating), the load current I1 supplied to the light emitting diodes 31 from the power supply circuit 1 is maximized. Also, in the present embodiment, as a dimming method of the light emitting diodes 31, there is used a burst dimming method of periodically turning on and off the light emitting diodes 31 and changing a ratio of on-period thereof. Thus, the power supply control circuit 13 controls the constant current circuit 12 such that an average value of the load current I1 rather than an instantaneous value of the load current I1 becomes the current value corresponding to the dimming level.

The load variation circuit 4 includes a series circuit of a diode D1 and a resistor R1. Further, the load variation circuit 4 is connected in series to the load circuit 3 between the output terminals of the power supply circuit 1.

As the switching element Q1, a n-channel Metal-Oxide-Semiconductor-Field-Effect-Transistor (MOSFET) is used, which is connected in parallel to the load variation circuit 4 (the series circuit of the diode D1 and the resistor R1).

The signal output circuit 2 turns on and off the switching element Q1 by outputting a binary communication signal to the switching element Q1. If the switching element Q1 is turned on, a short circuit occurs between both terminals of the load variation circuit 4, and the load current I1 flowing through the load circuit 3 bypasses the load variation circuit 4. On the other hand, if the switching element Q1 is turned off, the load current I1 flows through the load circuit 3 and the load variation circuit 4.

Therefore, when the switching element Q1 is turned off, the current value of the load current I1 becomes smaller and the light quantity of the light emitting diodes 31 is also reduced compared to a case where the switching element Q1 is turned on. Thus, the switching element Q1 switches whether the load variation circuit 4 is added to the load circuit 3, i.e., electrically connect or disconnect the load variation circuit 4 to the load circuit 3, in response to the binary communication signal. Accordingly, the load variation circuit 4 partially changes the load characteristics of the load circuit 3 as it is added to the load circuit 3.

Further, the visible light communication apparatus includes a control power supply circuit 5 as a power supply of the signal output circuit 2. A series circuit of a diode D2 and a capacitor C1 is connected between the output terminals of the power supply circuit 1, and the control power supply circuit 5 is connected in parallel across the capacitor C1. The control power supply circuit 5 includes a DC-DC converter circuit. Thus, The control power supply circuit 5 converts a voltage inputted from the power supply circuit 1 through the diode D2 into a control power supply voltage of, e.g., 5V, and outputs it to the signal output circuit 2.

Furthermore, the visible light communication apparatus includes a load voltage detection circuit 6. The load voltage detection circuit 6 detects a load voltage applied to the load circuit 3 from the power supply circuit 1, and outputs a detection value to the signal output circuit 2. If the switching element Q1 is turned off when the dimming level of the light emitting diodes 31 is near a lower limit value, there is a possibility that the load current I1 is further reduced and the light emitting diodes 31 is turned off. Thus, on the basis of the detection value of the load voltage detection circuit 6, the signal output circuit 2 stops a modulation operation by turning on the switching element Q1 all the time if the dimming level of the light emitting diodes 31 is near the lower limit value.

As described above, in the visible light communication apparatus of the present embodiment, the signal output circuit 2 outputs a communication signal to control the turn-on and the turn-off of the switching element Q1, and modulates the light intensity of the light emitting diodes 31, thereby superimposing the communication signal on the illumination light outputted from the light emitting diodes 31.

Figure 2:
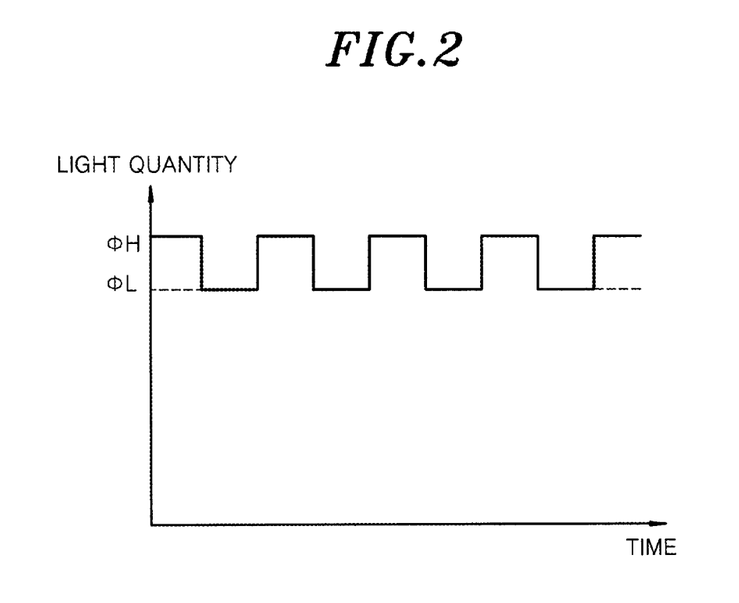
FIG. 2 is a graph showing a change in light quantity during modulation.

Next, a modulation degree MH of the visible light communication apparatus of the present embodiment will be described. FIG. 2 shows a change in light quantity (light intensity) of the light emitting diodes 31 when turning on and off the switching element Q1. When the switching element Q1 is turned on, i.e., when the load variation circuit 4 is not added to the load circuit 3, the light quantity of the light emitting diodes 31 is $\Phi H$. On the other hand, when the switching element Q1 is turned off, i.e., when the load variation circuit 4 is added to the load circuit 3, the light quantity of the light emitting diodes 31 is $\Phi L$ ($<\Phi H$). In this case, the modulation degree MH is represented by MH= $(\Phi H - \Phi L)/\Phi H$.

Figure 3:
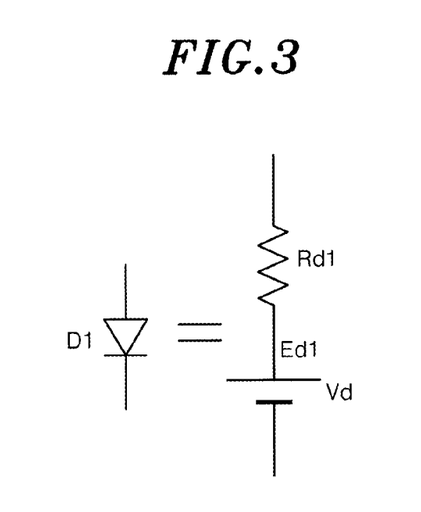
FIG. 3 is an equivalent circuit diagram of a diode.
Figure 4:
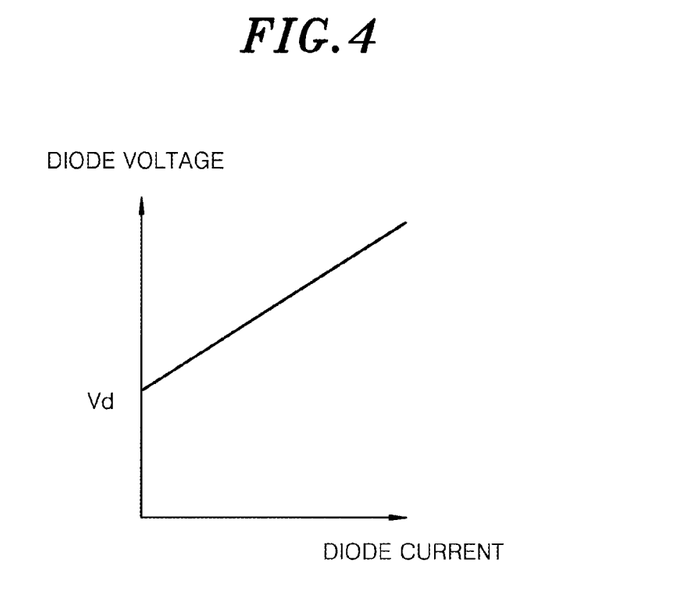
FIG. 4 schematically shows a characteristic curve of diode current-voltage.

Now, an equivalent resistance Rd1 of the diode D1 included in the load variation circuit 4 will be described. As shown in FIG. 3, an equivalent circuit of the diode D1 is represented by a series circuit of the equivalent resistance Rd1 and a voltage source Ed1. FIG. 4 is a schematic graph shows the characteristics of a voltage (hereinafter, referred to as diode voltage) across the diode D1 with respect to a current (hereinafter, referred to as diode current) flowing through the diode D1. The voltage value of the voltage source Ed1 is a forward voltage Vd which is a diode voltage at a time point when the current starts to flow through the diode D1. Further, as the diode current increases, the diode voltage also increases. At this time, a slope of an increase in diode voltage is represented by a resistance value rd1 of the equivalent resistance Rd1.

Figure 5:
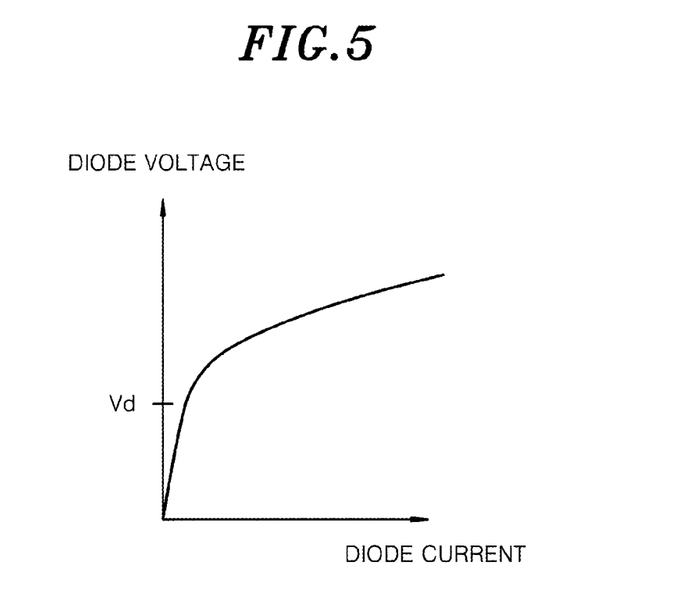
FIG. 5 specifically shows a characteristic curve of diode current-voltage.

Actually, the diode D1 has the characteristic that the resistance value rd1 of the equivalent resistance Rd1 varies depending on a current value of the diode current. If the current value of the diode current is relatively large, the resistance value rd1 has a relatively small value. On the other hand, if the current value of the diode current is relatively small, the resistance value rd1 has a relatively large value. Thus, more specifically, the diode voltage with respect to the diode current has the characteristics as shown in FIG. 5. As the diode current decreases, the slope of the increase in diode voltage becomes large. As a result, the resistance value rd1 of the equivalent resistance Rd1 increases.

Figure 6:
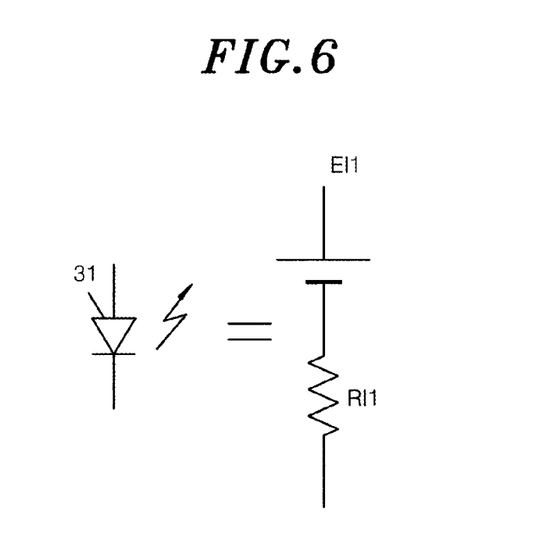
FIG. 6 is an equivalent circuit diagram of a light emitting diode.

In addition, as shown in FIG. 6, the equivalent circuit of each of the light emitting diodes 31 is represented by a series circuit of an equivalent resistance Rl1 and a voltage source El1. Similarly to the diode D1, each of the light emitting diodes 31 has the characteristics that a resistance value rl1 of the equivalent resistance Rl1 increases as the current flowing through each of the light emitting diodes 31 decreases.

Figure 7:
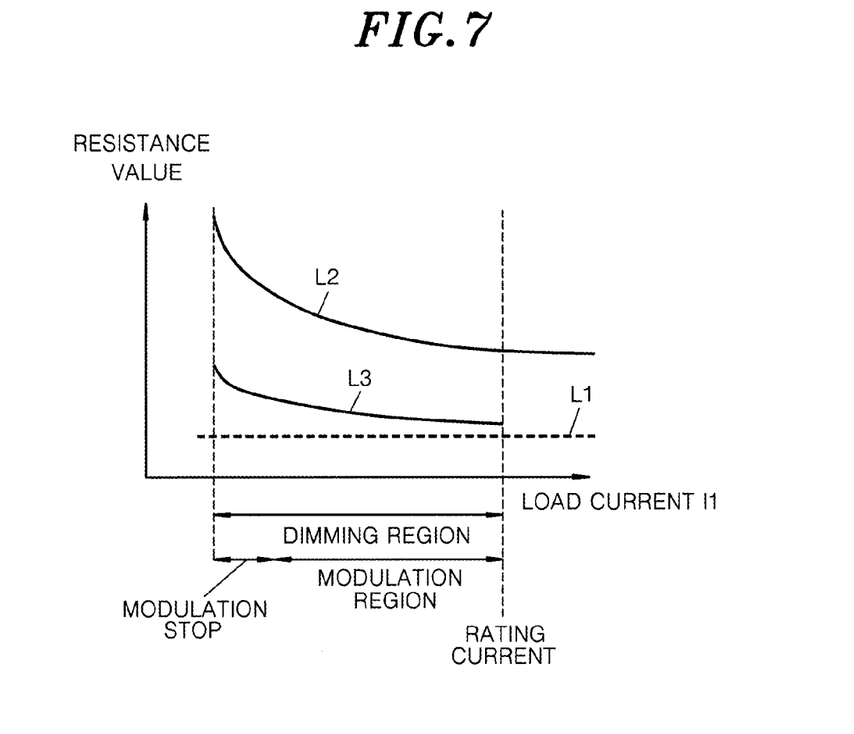
FIG. 7 shows characteristic curves of load current-resistance value.

FIG. 7 shows changes in resistance values with respect to the load current I1. In FIG. 7, L1 indicates a resistance value r1 of the resistor R1 with respect to the load current I1, and L2 indicates a resistance value r3 of the equivalent resistance of the load circuit 3 (series circuit of the light emitting diodes 31) with respect to the load current I1. In FIG. 7, L3 represents a resistance value r4 of the equivalent resistance of the load variation circuit 4 (series circuit of the resistor R1 and the diode D1) with respect to the load current I1. Herein, if the number of the light emitting diodes 31 which are connected in series is N (N is a natural number), the resistance value r3 of the equivalent resistance of the load circuit 3 is represented by r3=N×rl1. Further, a resistance value r4 of the equivalent resistance of the load variation circuit 4 is represented by r4=r1+rd1.

As described above, the visible light communication apparatus of the present embodiment controls dimming of the light emitting diodes 31 by increasing or decreasing the load current I1. In this case, the resistance value r1 of the resistor R1 is constant regardless of the current value of the load current I1 (see the graph L1 in FIG. 7). On the other hand, the resistance value r3 of the equivalent resistance of the load circuit 3 increases as the load current I1 decreases (see the graph L2 in FIG. 7). Thus, the ratio of the resistance value r1 to the resistance value r3 decreases as the load current I1 decreases. Therefore, in a conventional visible light communication apparatus in which the load variation circuit is formed of only the resistor R1, the modulation degree MH is low in a region in which the load current I1 is small.

However, in the visible light communication apparatus of the present embodiment, the load variation circuit 4 includes a series circuit of the resistor R1 and the diode D1. Therefore, since the resistance value r4 of the equivalent resistance of the load variation circuit 4 is the sum of the resistance value r1 of the resistor R1 and the resistance value rd1 of the equivalent resistance Rd1 of the diode D1, it increases as the load current I1 decreases (see the graph L3 in FIG. 7).

In this case, when calculating the modulation degree MH using parameters of the resistor R1, the diode D1 and the light emitting diodes 31, the modulation degree MH is represented by the following Eq. 1. Herein, the current i1 is the current value of the load current I1 when the load variation circuit 4 is added to the load circuit 3, and the voltage value of the voltage source El1 is omitted because it does not influence the modulation degree.

$$MH = \frac{(r1+rd1) \times i1 + Vd}{(r1+rd1+N \times rl1) \times i1 + Vd} \quad \text{Eq. 1}$$

Figure 8:
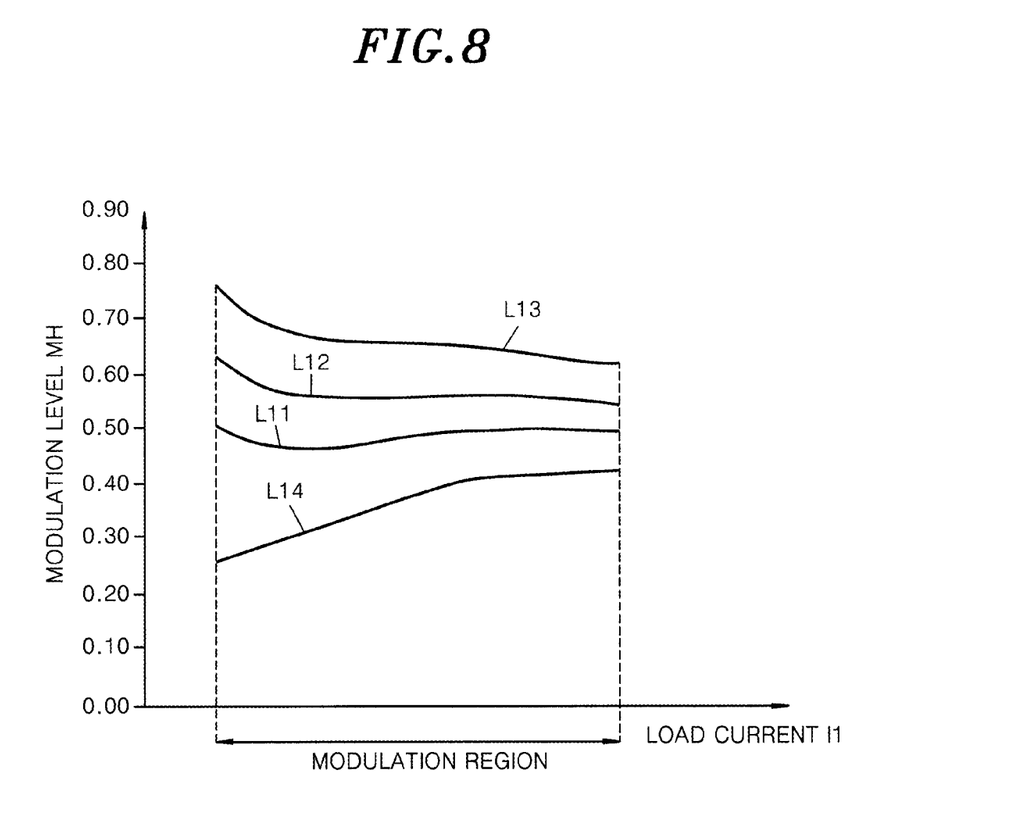
FIG. 8 shows characteristic curves of load current-modulation degree.

The resistance value r1 of the resistor R1 is set to 18Ω, and the resistance value rd1 of the equivalent resistance Rd1 of the diode D1 is set to about 1Ω (during rating of the load current I1). Further, a change of the modulation degree MH when the forward voltage Vf of the diode D1 is simulated in three patterns of 0.7V, 1.5V and 3.0V is shown in FIG. 8. In FIG. 8, L11 is a graph indicating the modulation degree MH with respect to the load current I1 when a forward voltage Vf is 0.7V, L12 is a graph indicating the modulation degree MH with respect to the load current I1 when the forward voltage Vf is 1.5V, and L13 is a graph indicating the modulation degree MH with respect to the load current I1 when the forward voltage Vf is 3.0V. Further, in FIG. 8, L14 is a graph showing a change of the modulation degree MH when the load variation circuit includes only the resistor R1 without the diode D1.

In the case of a conventional configuration in which the load variation circuit includes only the resistor R1, since rd1=0 and Vd=0 in Eq. 1, the modulation degree MH is represented by the following Eq. 2.

$$MH = \frac{r1}{r1 + N \times rl1} \quad \text{Eq. 2}$$

Therefore, when the load current I1 is reduced, since only a denominator term (N×rl1) increases in Eq. 2, the modulation degree MH is greatly reduced (see the graph L14 in FIG. 8).

However, in the configuration of the present embodiment in which the load variation circuit 4 includes the resistor R1 and the diode D1, when the load current I1 is reduced, both a denominator term (rd1+N×rl1) and a numerator term (rd1) in Eq. 1 increase. Further, when the current value i1 of the load current I1 is small, the ratio of the forward voltage Vf of the diode D1 in the denominator and numerator of Eq. 1 increases. Therefore, in the visible light communication apparatus of the present embodiment, a decrease in the modulation degree MH is suppressed even when the load current I1 is reduced (see the graphs L11 to L13 of FIG. 8).

Since the load variation circuit 4 includes the diode D1, as compared with the case of including only the resistor R1, the modulation degree MH increases over all the range of the dimming region, and the modulation degree MH increases in the vicinity to the lower limit value of the load current I1 (near the dimming lower limit). Further, as the forward voltage Vf of the diode D1 increases, the modulation degree MH increases, and the reduction of the modulation degree MH is suppressed when the load current I1 is reduced. In the case of using the diode D1 having a forward voltage of 3.0V, the modulation degree MH increases as the load current I1 decreases.

As described above, in the visible light communication apparatus of the present embodiment, with a simple configuration in which the load variation circuit 4 is constituted by the series circuit of the resistor R1 and the diode D1, it is possible to suppress the occurrence of a communication error and a reduction in the modulation degree MH during dimming when the load current I1 is relatively small. Further, since the forward voltage Vf occurs across the diode D1 by a current flowing through the diode D1 and the resistance value rd1 is determined according to the value of the current, the reduction in the modulation degree MH is compensated without a delay in response to a change in the load current I1. In addition, since there is no need for a complicated configuration in which the current value of the load current I1 is detected and the resistance value of the load variation circuit 4 is changed according to the detected current value of the load current I1, it is possible to configure the visible light communication apparatus at low cost.

In addition, as shown in FIG. 8, even if the forward voltage Vf of the diode D1 varies, the modulation degree MH is higher than the conventional configuration in which the load variation circuit includes only the resistor R1, and a reduction in the modulation degree MH during dimming is also suppressed.

In the present embodiment, the resistance value r1 of the resistor R1 is set to be larger than the resistance value rd1 of the equivalent resistance Rd1 of the diode D1. For example, the resistance value r1 of the resistor R1 is set to be 18Ω, and the resistance value rd1 of the equivalent resistance Rd1 of the diode D1 is set to about 1Ω to 2Ω (which ranges from the upper limit value to the lower limit value of the dimming region of the load current I1). By this setting, when the load current I1 is relatively large, e.g., a rated current, since the resistance value rd1 of the equivalent resistance Rd1 of the diode D1 becomes small, power loss in the load variation circuit 4 is also reduced. Further, the resistor R1 has a small variation in the resistance value r1 between elements as compared to the equivalent resistance Rd1 of the diode D1. Therefore, although the resistance value rd1 of the equivalent resistance Rd1 of the diode D1 varies between elements, since the resistance value r1 is sufficiently greater than the resistance value rd1 (r1>rd1), it is possible to suppress an influence on the resistance value r4 of the equivalent resistance of the load variation circuit 4.

Further, the resistance value r1 of the resistor R1 and the resistance value rd1 of the equivalent resistance Rd1 of the diode D1 are not limited to the above values. For example, the resistance value r1 of the resistor R1 may be set to 5Ω to 100Ω. In addition, in the equivalent resistance Rd1 of the diode D1, the resistance value rd1 at the rated current of the load current I1 may be set to 0.2Ω to 0.3Ω, and the resistance value rd1 at the lower limit of the dimming region of the load current I1 may be set to 1.2Ω. In order to further increase the above-described effect, it is preferable that the resistance value r1 of the resistor R1 is 16 to 500 times the resistance value rd1 of the equivalent resistance Rd1 of the diode D1 at the rated current of the load current I1. Also, it is preferable that the resistance value r1 of the resistor R1 is 4 to 83 times the resistance value rd1 of the equivalent resistance Rd1 of the diode D1 at the lower limit of the dimming region of the load current I1.

In a case of constituting the load variation circuit 4 as only one or more diodes D1, and compensating for a reduction in the modulation degree MH when the load current I1 decreases, since the rated current value of the load circuit 3 serving as a light source is set to various values (e.g., 150 mA, 350 mA, and 500 mA, etc.) depending on the visible light communication apparatuses, it is necessary to change the number of diodes D1 connected in series to correspond to various rated current values. Accordingly, since it is necessary to design a mounting substrate for each visible light communication apparatus according to the number of diodes D1, the management becomes difficult and the cost increases.

However, in the present embodiment, the load variation circuit 4 is constituted by the series circuit of the diode D1 and the resistor R1, and the resistance value r1 is set to be greater than the resistance value rd1 (r1>rd1) such that the resistance value r1 of the resistor R1 becomes dominant. Therefore, it is possible to correspond to various rated current values only by changing the resistance value r1 of the resistor R1. Further, the resistance value r1 can be easily changed simply by replacing the resistor R1 without changing the number of diodes, and the mounting substrate can be shared even when the rated current value is different. Accordingly, it is possible to reduce the costs. Thus, by constituting the load variation circuit 4 as the series circuit of the diode D1 and resistor R1, it is possible to not only compensate for a reduction in the modulation degree MH during dimming, but also obtain an advantage in terms of costs.

As described above, the visible light communication apparatus of the present embodiment includes the constant current circuit 12, the load circuit 3, the load variation circuit 4 and the switching element Q1. The load circuit 3 includes the light emitting diodes 31 (light emitting elements) connected to the output terminals of the constant current circuit 12. The load variation circuit 4 partially changes the load characteristics of the load circuit 3 by being added to the load circuit 3. The switching element Q1 electrically connects or disconnects the load variation circuit 4 to the load circuit 3 in response to the binary communication signal. Further, the load variation circuit 4 includes the series circuit of the resistor R1 and the diode D1 connected in series to the light emitting diodes 31. The resistance value r1 of the resistor R1 is greater than the resistance value rd1 of the equivalent resistance Rd1 of the diode D1. By the above configuration, there is an effect that it is possible to suppress a reduction in the modulation degree MH during dimming at low cost.

In the present embodiment, the diode D1 may be formed of a rectifier diode which is widely used for rectifying. Since the rectifier diode can be obtained at low cost, it is possible to suppress an increase in cost due to provision of the diode D1 in the load variation circuit 4.

Alternatively, the diode D1 may be formed of a light emitting diode. By using a light emitting diode, it is possible to not only compensate for a reduction in the modulation degree MH, but also function as an indicator indicating a modulation operation.

Further, the light emitting elements constituting the load circuit 3 are not limited to the light emitting diodes 31, and may be constituted by, e.g., organic electro-luminescence (EL) elements or the like.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A visible light communication apparatus comprising:
   a constant current circuit;
   a load circuit including light emitting elements connected to output terminals of the constant current circuit;
   a load variation circuit configured to change load characteristics of the load circuit by electrically connecting to the load circuit, the load variation circuit including a series circuit of a diode and a resistor connected in series to the load circuit; and
   a switching element configured to electrically connect or disconnect the load variation circuit to the load circuit in response to a binary communication signal,
   wherein the load variation circuit and the switching element are connected in parallel,
   wherein the load variation circuit partially changes load characteristics of the load circuit, wherein a resistance value of the resistor is greater than a resistance value of an equivalent resistance of the diode, and wherein a modulation degree MH of illumination light of the light emitting elements as a result of turning the switching element on and off is represented by:

$$MH = \frac{(r1 + \text{rd}1) \times i1 + Vd}{(r1 + \text{rd}1 + N \times rl1) \times i1 + Vd}$$

where r1 represents the resistance value of the resistor, rd1 represents the resistance value of the equivalent resistance of the diode, i1 represents a load current through the load circuit when the load variation circuit is added to the load circuit, Vd represents a forward voltage of the diode at a point in time when current starts to flow through the diode, N represents a number of the light emitting elements connected in series in the load circuit, and rl1 represents a resistance value of an equivalent resistance of each of the light emitting elements.

2. The visible light communication apparatus of claim 1, wherein the diode is a rectifier diode.

3. The visible light communication apparatus of claim 1, wherein the diode is a light emitting diode.

4. The visible light communication apparatus of claim 1, wherein a magnitude of a load current flowing through the load circuit when the load variation circuit is electrically connected to the load circuit is smaller than a magnitude of a load current flowing through the load circuit when the load variation circuit is electrically disconnected from the load circuit.

\* \* \* \* \*